United States Patent [19]

Okada

[11] 4,298,885
[45] Nov. 3, 1981

[54] LUMINANCE CONTROL CIRCUIT FOR A TELEVISION RECEIVER

[75] Inventor: Takashi Okada, Yokohama, Japan

[73] Assignee: Sony Corporation, Tokyo, Japan

[21] Appl. No.: 84,751

[22] Filed: Oct. 15, 1979

[30] Foreign Application Priority Data

Oct. 17, 1978 [JP] Japan ................. 53-127566

[51] Int. Cl.³ .......................................... H04N 5/14
[52] U.S. Cl. ............................... 358/39; 358/40; 358/27; 358/169; 358/243
[58] Field of Search ............ 358/39, 40, 243, 168, 358/169, 170, 171, 27

[56] References Cited

U.S. PATENT DOCUMENTS 4,081,838  3/1978  Wheeler ........................... 358/169

4,137,552  1/1979  Serafini ............................ 358/243

*Primary Examiner*—Robert L. Richardson
*Attorney, Agent, or Firm*—Lewis H. Eslinger; Alvin Sinderbrand

[57] ABSTRACT

A luminance control circuit for a television receiver produces a control signal in response to a video signal exceeding an end of the dynamic range of a cathode ray tube. Gain control circuits in the path of the video signal to the cathode ray tube adjust their gain in response to the control signal to maintain the video signal within the dynamic range of the cathode ray tube. The end of the dynamic range at which the video signal may be controlled includes one or both of the white peak and black levels. The control signal may also be responsive to an average cathode ray tube beam current exceeding a predetermined value.

29 Claims, 16 Drawing Figures

LUMINANCE CONTROL CIRCUIT FOR A TELEVISION RECEIVER

BACKGROUND OF THE INVENTION

The present invention relates generally to a luminance control circuit for a television receiver, and is directed more particularly to a luminance control circuit for a television receiver in which the limited dynamic range of the phosphor on a cathode ray tube is optimally utilized to reproduce a broadcast video signal.

The phosphor of a cathode ray tube has a limited dynamic range for the production of luminance in response to video signals applied thereto. At a particular minimum video signal level called the cutoff level, negligible luminance is produced by the phosphor. Further reduction in video signal level makes negligible perceptible change on the cathode ray tube. At a particular maximum video signal level, called the saturation level, the phosphor is providing all of the luminance of which it is capable. Further increase in video signal level again makes negligible perceptible change on the cathode ray tube. The dynamic range of a cathode ray tube is defined as the range between the cutoff and saturation levels.

For optimum reproduction of a broadcast video signal, the maximum luminance, called the white peak level, should coincide with the saturation level of the tube, and the minimum luminance, or black level, should coincide with the cutoff level of the tube. These conditions have been difficult to achieve since broadcast video signals do not always contain white peak and black levels which are consistent with the capabilities of certain cathode ray tubes.

A further problem occurs when the average beam current in a cathode ray tube exceeds a predetermined value. The high voltage circuit and/or the phosphor may be damaged by such overload.

In the prior art, limiter circuits have been employed to limit the peak beam current to a value which retains it within the dynamic range of the cathode ray tube. When a single limiter circuit is used on the luminance signal prior to using it to control a color matrix, high intensity color difference signals applied to the matrix circuit may produce beam currents which are determined more by such color difference signals than by the level of the luminance signal. Thus the video signal may not be limited to below the saturation level. If a separate limiting circuit is used on each of the three color signals fed to a cathode ray tube, when the level of one of the colors exceeds the limiting level and the others do not, the high-level color is proportionately deleted from the color picture reproduced by the cathode ray tube. This changes the color of the reproduced image to induce color in a white signal or to distort the color in a colored signal.

OBJECTS AND SUMMARY OF THE INVENTION

Accordingly, it is an object of the present invention to provide a novel luminance control circuit for a television receiver.

It is another object of the present invention to provide a luminance control circuit for a television receiver free of the defects in the prior art.

A further object of the present invention is to provide a luminance control circuit for a television receiver which makes maximum use of the limited dynamic range of a cathode ray tube used therein to reproduce a broadcast video signal.

According to an aspect of the invention, there is provided a luminance control circuit for a television receiver which is operative to reproduce a video signal applied to a cathode ray tube having a dynamic range between a cutoff level and a saturation level, comprising means for sensing at least one of the cutoff level and the saturation level and means for producing a control signal in response thereto, and control means responsive to the control signal for varying a characteristic of the video signal applied to the cathode ray tube, whereby the video signal applied to the cathode ray tube is maintained within the dynamic range.

The above, and other objects, features and advantages of the present invention, will become apparent from the following description read in conjunction with the accompanying drawings in which like reference numerals designate the same elements.

DETAILED DESCRIPTION OF CERTAIN PREFERRED EMBODIMENTS

Figure 1:
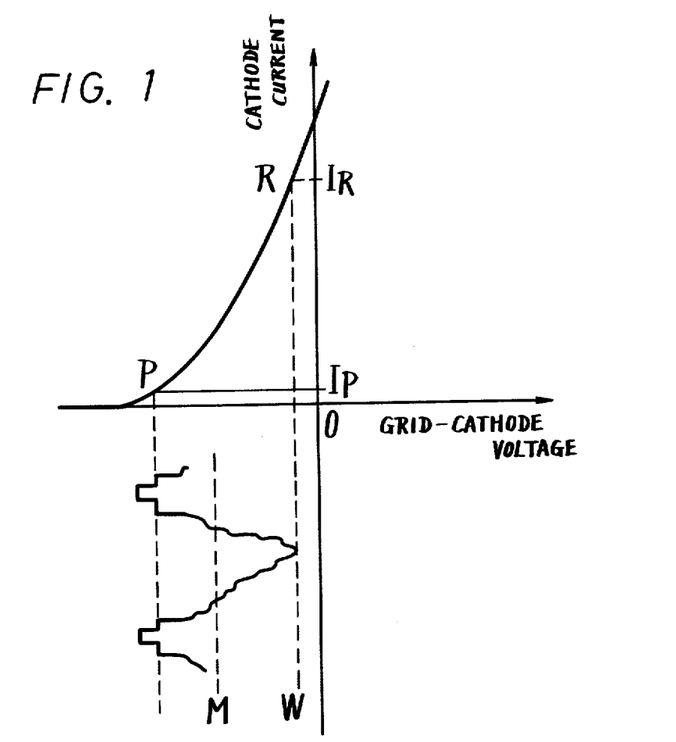
FIG. 1 is a waveform diagram to which reference will be made in defining the dynamic range of a cathode ray tube.

Referring to FIG. 1, the dynamic range of a cathode ray tube is limited to reproduction of video signals between a cutoff voltage P which produces a cathode current $I_P$, determined by the voltage at which the phosphor of the cathode ray tube remains unexcited, and a saturation voltage R, which produces a cathode current $I_R$ at which further increase in grid-cathode voltage produces little increase in luminance. Point R is optimally at the white level W and point P is optimally at the black level (pedestal level) of the video signal. The wider the range between points P and R, the better is the dynamic range of the cathode ray tube and the better is its ability to reproduce varying picture luminance levels.

A maximum average beam current shown by dashed line M should not be exceeded to avoid damage to the high voltage circuit and the phosphor on the face of the cathode ray tube.

Before describing the present invention in detail, a brief description will be given of luminance control circuits according to the prior art.

Figure 2:
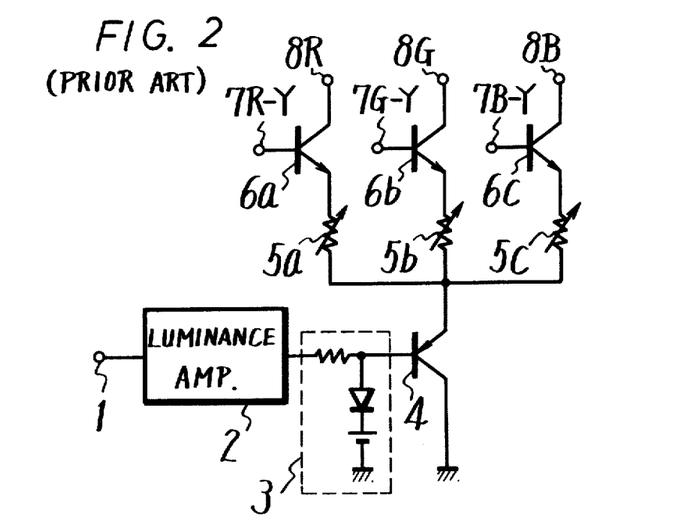
FIG. 2 is a block and schematic diagram showing an automatic luminance control circuit for a television receiver according to the prior art.

Referring now to the prior art circuit in FIG. 2, an input terminal 1 receives a luminance signal Y which is amplified in a luminance signal amplifier 2 and fed to a limiter circuit 3, having a single limiter diode biased by a voltage source, which limits the peak value of the luminance signal Y to a predetermined value determined by the voltage source. The limited signal is fed to the base of a PNP transistor 4 forming part of a matrix circuit. The collector of transistor 4 is grounded and its emitter is connected through variable drive-adjusting resistors 5a, 5b and 5c to the emitters of NPN transistors 6a, 6b and 6c, respectively. Color difference signals R-Y, G-Y and B-Y (where R, G and B are red, green and blue color signals, respectively) are supplied through input terminals 7R-Y, 7G-Y and 7B-Y to the bases of transistors 6a, 6b and 6c, respectively. Output terminals 8R, 8G and 8B, connected to the collectors of transistors 6a, 6b and 6c, supply the R, G and B signals, respectively, to a color cathode ray tube (not shown in FIG. 2).

The single limiter diode used in the single limiter circuit 3 of FIG. 2 limits the peak level of a video signal applied to matrix transistors 6a, 6b and 6c rather than to the color cathode ray tube. When the levels of the color difference signals R-Y, G-Y and B-Y fed to input terminals 7R-Y, 7G-Y and 7B-Y are high, the level of the beam current of the color cathode ray tube may be determined principally by the color difference signals rather than by the luminance signal. Thus the peak level of the signals actually applied to the cathode ray tube may not be properly limited in the desired manner.

Figure 3:
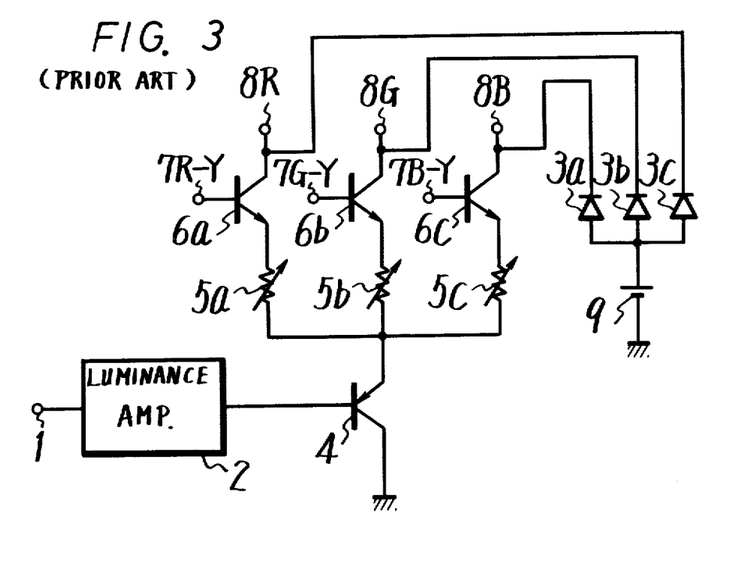
FIG. 3 is a block and schematic diagram of a second automatic luminance control circuit for a television receiver according to the prior art.

The circuit of FIG. 3 solves some of the problems of the circuit of FIG. 2 but creates additional problems of its own. Luminance signal Y is fed through input terminal 1 and luminance signal amplifier 2 to the base of transistor 4. Individual limiter diodes 3a, 3b and 3c are connected between the collectors of transistors 6a, 6b and 6c and the positive electrode of a voltage source represented as a battery 9. The negative electrode of battery 9 is grounded. The remainder of the circuit in FIG. 3 is substantially the same as the circuit in FIG. 2, and its components are therefore not further described.

The peak levels of the R, G and B signals delivered to the collectors of transistors 6a, 6b and 6c are limited by diodes 3a, 3b and 3c to prevent excessive signal levels being applied to the cathode ray tube by high level color difference signals. However, when one or two of the R, G and B signals exceeds the threshold, a portion of this (or these) signals(s) is shunted to ground through one or more of appropriate diodes 3a, 3b and 3c. The remaining R, G and B signals are thus no longer in their original proportion and the displayed color in so-called white peaks is distorted.

Figure 4:
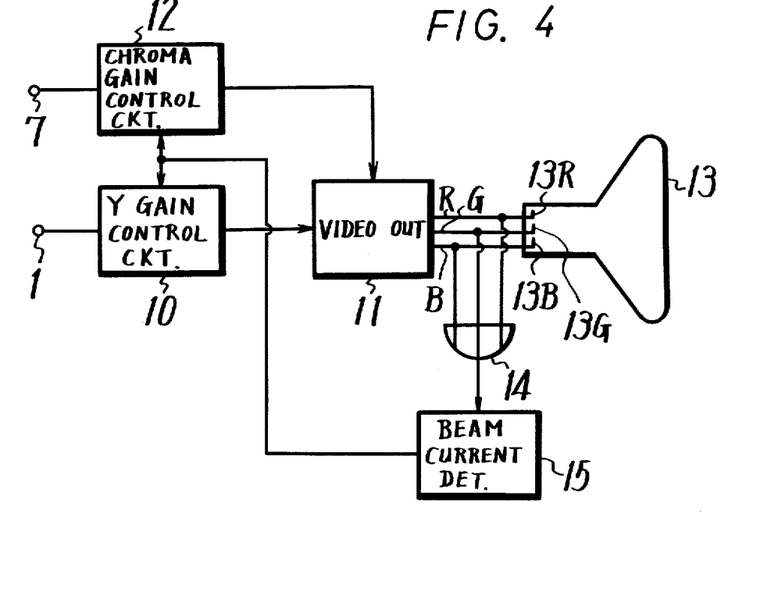
FIG. 4 is a block diagram of a luminance control circuit for a television receiver according to an embodiment of the present invention.

Referring now to an embodiment of the present invention shown in FIG. 4, luminance signal Y is seen to be applied to input terminal 1 of a Y gain control circuit 10. An output of gain control circuit 10 is applied to an input of a video output circuit 11. Video output circuit 11 may include appropriate circuits corresponding to a color demodulation circuit, matrix circuit, video signal amplifying circuit, etc. A chrominance signal applied to an input terminal 7 is supplied through a chrominance gain control circuit 12 to a chrominance signal input terminal of video output circuit 11 which then produces appropriate R, G and B signals at its output which are fed to red, green and blue cathodes 13R, 13G and 13B of a color cathode ray tube 13, respectively. The R, G and B signals from video output circuit 11 are also fed to first, second and third input terminals of an OR circuit 14. The OR circuit is adapted to supply as an output signal the input signal having the largest amplitude. The output signal from OR circuit 14 is fed to a beam current detecting circuit 15. Beam current detecting circuit 15 detects if the cathode current, as represented by the output signal from the OR circuit, exceeds a reference value and, if so, produces a gain control signal in response thereto. The gain control signal from beam current detecting circuit 15 is applied to gain control circuits 10 and 12 to thereby control the amplitudes of both the luminance signal Y and the chrominance signal, respectively. The gains of gain control circuits 10 and 12 are adjusted by the gain control signal such that the white peak level of the video signal coincides with saturation voltage R in FIG. 1. Thus, when the beam current produced in response to a video signal exceeds a saturation cathode current $I_R$ (FIG. 5A), such beam current is reduced to a beam current having a maximum no higher than saturation current $I_R$ (FIG. 5B).

By using beam current detecting circuit 15 to control the amplitudes of the luminance and chrominance signals, accurate limiting is maintained unaffected by drive adjustment or scattering of characteristics of cathode ray tubes, and without coloring white peaks, even when the three color difference signals have different levels.

Figure 6:
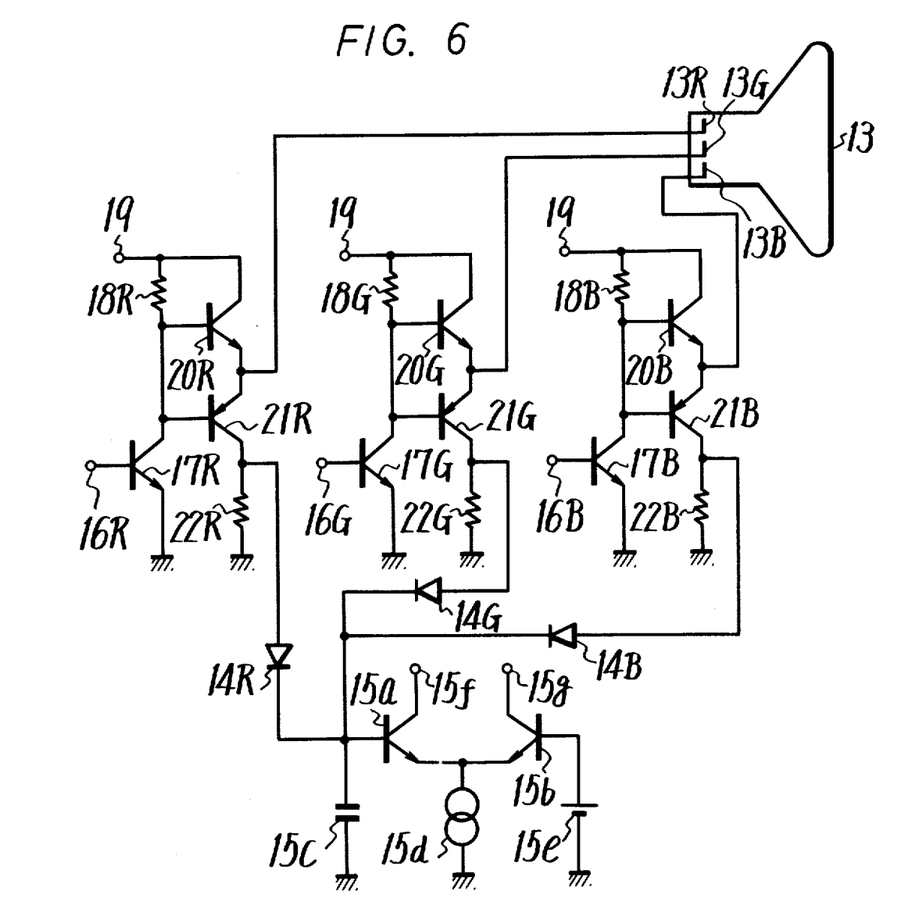
FIG. 6 is a detailed schematic diagram of the embodiment of the invention shown in FIG. 4.

Referring now to FIG. 6, a detailed schematic diagram of part of the circuit in FIG. 4 is shown. Parts or elements having numeral 15 in their reference numerals are part of beam current detector 15 (FIG. 4). Similarly, parts or elements having numeral 14 in their reference numerals are part of OR circuit 14 (FIG. 4). R, G and B signals are applied from the matrix circuit (not shown in FIG. 6) through input terminals 16R, 16G and 16B to the bases of NPN transistors 17R, 17G and 17B, which form a video output amplifying circuit. The emitters of transistors 17R, 17G and 17B are grounded, and their collectors are connected through resistors 18R, 18G and 18B to power supply terminals 19, to which a positive DC voltage is applied. The collectors of transistors 17R, 17G and 17B are also connected to the bases of NPN transistors 20R, 20G and 20B and PNP transistors 21R, 21G and 21B, respectively. The emitter of transistor 20R is connected to the emitter of transistor 21R; the emitter of transistor 20G is connected to the emitter of transistor 21G; and the emitter of transistor 20B is connected to the emitter of transistor 21B. The junctions of the emitters of the pairs of transistors 20R and 21R, 20G and 21G, and 20B and 21B are respectively connected to cathodes 13R, 13G and 13B of color cathode ray tube 13. The collectors of transistors 20R, 20G and 20B are connected to power supply terminals 19, and the collectors of transistors 21R, 21G and 21B are connected through resistors 22R, 22G and 22B to ground for current detection. The collectors of transistors 21R, 21G and 21B are further connected through diodes 14R, 14G and 14B, which form OR circuit 14, to beam current detecting circuit 15. Beam current detecting circuit 15 is a differential amplifier employing transistors 15a and 15b. The signal from OR circuit 14 is applied to the base of transistor 15a and to one terminal of a capacitor 15c whose other terminal is connected to ground. The emitter of transistor 15a is connected to the emitter of transistor 15b. The connection point between the emitters of transistors 15a and 15b is connected to a constant current circuit 15d. The base of transistor 15b is supplied with a reference voltage $V_{Ref}$ by a source 15e. Output terminals 15f and 15g connect the control signal from transistors 15a and 15b, respectively to gain control circuits 10 and 12 (not shown in FIG. 6). When the resistances of resistors 22R, 22G and 22B are equal to R, the limiting current $I_{max}$ is given as follows:

$$I_{max} = V_{Ref}/R$$

Figure 7:
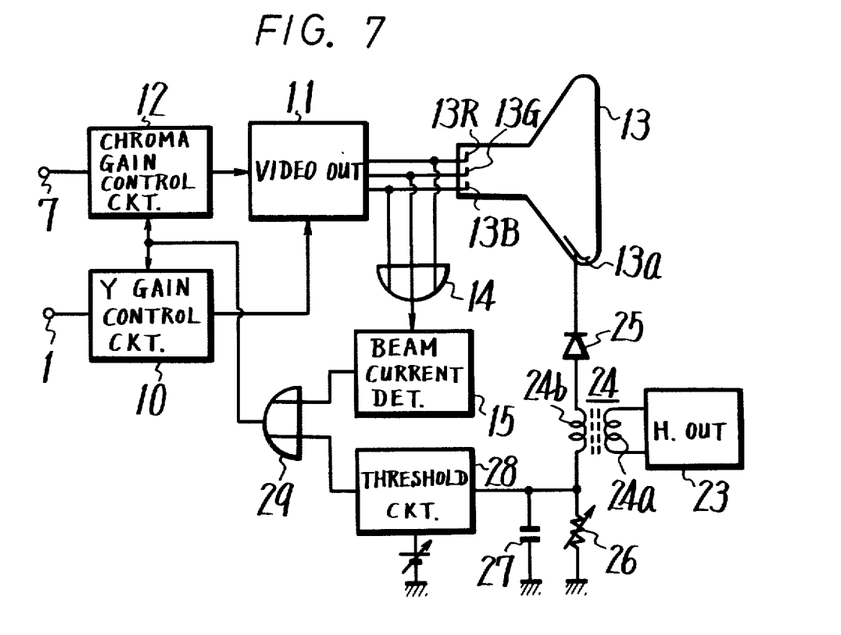
FIG. 7 is a block diagram of a second embodiment of the invention.

Referring now to FIG. 7, there is shown a second embodiment of the present invention in which an OR circuit 14 and a beam current detector 15 provide an output signal in response to the R, G and B signals applied to cathode ray tube 13. However, instead of the output of beam current detector 15 being directly applied to gain control circuits 10 and 12, it is applied through an OR circuit 29. An average automatic luminance limiting, or automatic beam limiting circuit (ABL circuit) is employed to produce a second input to OR circuit 29. Consequently, an output of OR circuit 29 is responsive to the greater of the R, G or B signals applied to cathode ray tube 13 and the average luminance signal from the ABL circuit.

The ABL circuit is part of a horizontal output circuit 23 whose output signal is supplied to a primary winding 24a of a conventional fly-back transformer 24. A secondary winding 24b of fly-back transformer 24 has one end connected through a high voltage rectifier or diode 25 to an anode 13a of color cathode ray tube 13. The other end of secondary winding 24b is connected to a parallel combination of a variable resistor 26 and a capacitor 27, the other ends of which are connected to ground and which form an average beam current detecting circuit of the ABL circuit. A voltage at the junction of secondary winding 24b and variable resistor 26 varies according to the average beam current. This voltage is connected to a threshold circuit 28. Threshold circuit 28 produces a control signal when the average beam current exceeds a predetermined threshold value. The threshold value is adjustable using the variable voltage source shown to limit the average beam current to the maximum allowable value M (FIG. 1). The control signal from threshold circuit 28 is applied to OR circuit 29. The control signal from OR circuit 29, selected from either the ABL circuit or beam current detector 15, is supplied to gain control circuits 10 and 12.

In order to adjust the level of the video signals to place them within the dynamic range of a cathode ray tube, either variable resistor 26 in the ABL circuit may be adjusted to vary the feedback voltage or the threshold voltage of threshold circuit 28 may be varied. If variable resistor 26 and threshold circuit 28 are set in their normal ranges, automatic control should be achieved without requiring further adjustment.

The gains of gain control circuits 10 and 12 are shown to be directly controlled by the output signal from threshold circuit 28. A DC amplifier circuit (not shown) may also be provided at the output of gain control circuit 10 and its gain may be controlled by the control signal from threshold circuit 28 to thereby control the DC level of the video signal.

The black level of a broadcast video signal is usually carefully established at the broadcast station. The black level of the received video signal may vary, however, and incorrect black level signals may exist in the received composite video signal. It is therefore desirable, in order to take maximum advantage of the dynamic range of a cathode ray tube, to automatically establish the darkest portion in the video signal as the black level.

Figure 8:
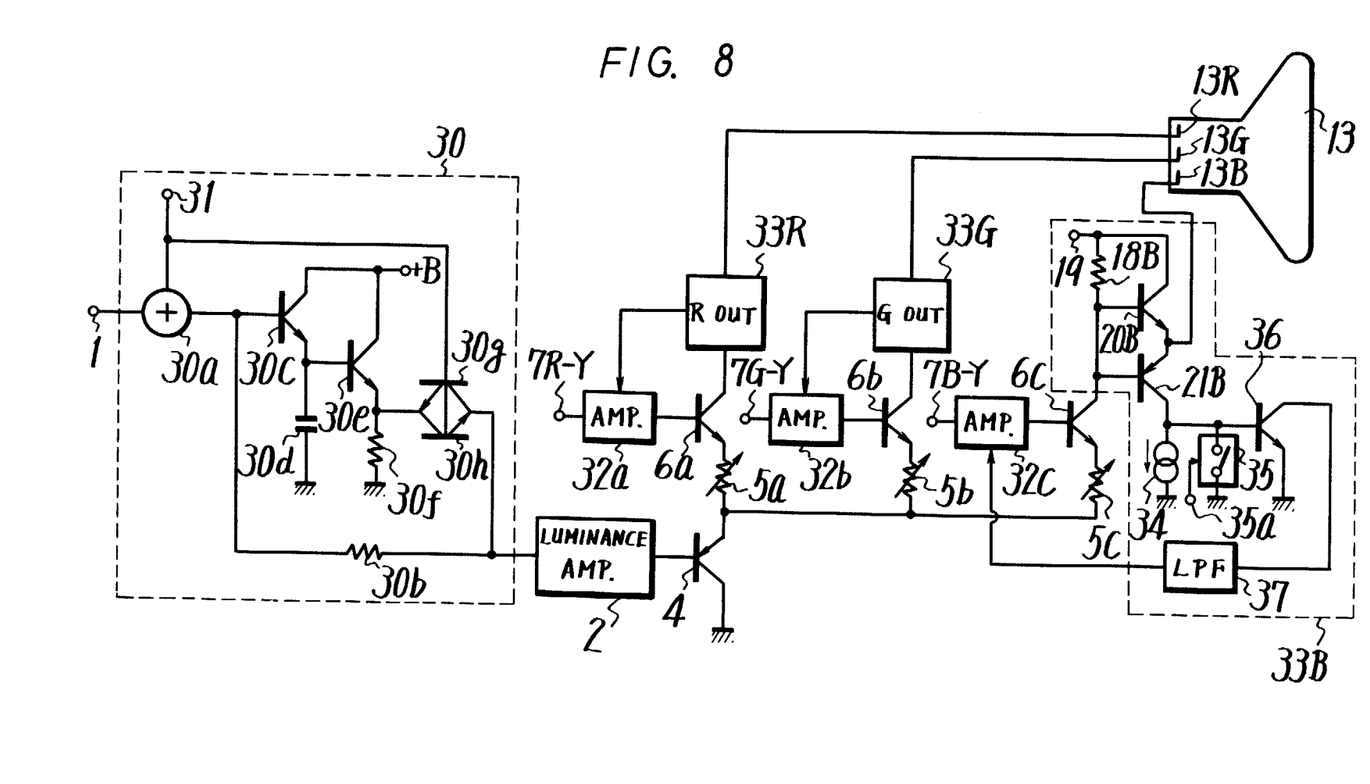
FIG. 8 is a block and schematic diagram showing a portion of a television receiver containing a third embodiment of the present invention.
Figure 9A:
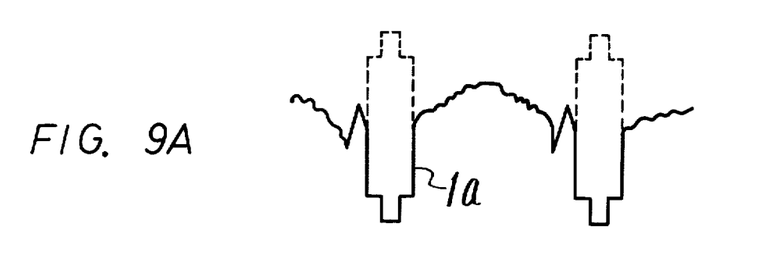
FIGS. 9A-9C are waveform diagrams to which reference will be made in explaining the operation of the embodiment of the invention shown in FIG. 8.
Figure 9B:
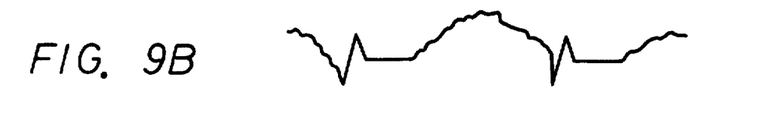

FIG. 8 is an automatic black level adjusting device for a color television receiver which automatically establishes the black level to be substantially equal to the darkest portion of the received video signal. A luminance signal (see solid line curve 1a in FIG. 9A) fed to luminance signal input terminal 1 is supplied to one input terminal of an adder circuit 30a in an automatic pedestal setting circuit 30. An inverse blanking signal (see dotted line curve in FIG. 9A) which is produced by conventional means, is supplied through an input terminal 31 to the other input terminal of adder circuit 30a. Adder circuit 30a produces a video signal from which the blanking signal is removed (FIG. 9B) to leave an intermediate signal level during the blanking period. The signal from adder circuit 30a is supplied through a resistor 30b to the input of luminance signal amplifier circuit 2 and also to the base of an NPN transistor 30c which, with capacitor 30d, form a peak detector circuit which detects and holds the peak negative values of the video signal. The collector of transistor 30c is connected to power supply terminal +B, and its emitter is connected to capacitor 30d and to the base of an NPN transistor 30e. The collector of transistor 30e is connected to power supply terminal +B, and its emitter is connected through resistor 30f to ground and to the junction of an emitter of an NPN transistor 30g and a collector of an NPN transistor 30h. Transistors 30g and 30h form a switching circuit. A junction of the collector of transistor 30g and the emitter of transistor 30h, is connected to the input of luminance signal amplifier circuit 2. The bases of transistors 30g and 30h are connected together and receive the inverse blanking signal at input terminal 31. The inverse blanking signal applied to the bases thereof makes transistors 30g and 30h conductive only during the blanking period to apply the peak negative level stored in capacitor 30d therethrough to luminance signal amplifier 2.

Figure 9C:
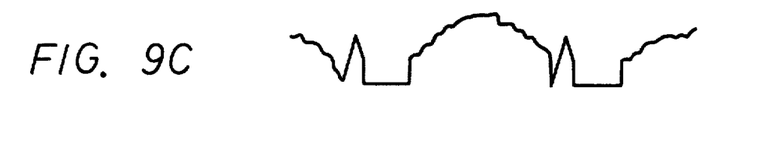

Accordingly, during the video portion of the signal, the switching circuit consisting of transistors 30g and 30h is cut off. Thus, the video is applied substantially unmodified to the input of luminance amplifier 2. During this time, the peak negative level of the video signal is being stored in capacitor 30d of the peak detector. During the blanking interval, switching transistors 30g and 30h are enabled or made conductive to apply the stored value of the negative peak of the video signal to the input of luminance amplifier 2 (FIG. 9C). The negative peak level is used to control the video level during subsequent video portions as will be explained.

The output signal from luminance signal amplifier circuit 2 is supplied to the base of transistor 4. The signal developed at the emitter of transistor 4 is supplied through variable drive adjustment resistors 5a, 5b and 5c to the emitters of respective matrix circuit transistors 6a, 6b and 6c. The R-Y, G-Y and B-Y signals at input terminals 7R-Y, 7G-Y and 7B-Y are respectively connected through amplifier circuits 32a, 32b and 32c to the bases of transistors 6a, 6b and 6c which have their collectors respectively connected through output circuits 33R, 33G and 33B to the red, green and blue cathodes 13R, 13G, and 13B of color cathode ray tube 13. Each of output circuits 33R, 33G and 33B includes an emitter follower and an automatic black level adjusting device as will be explained.

Output circuits 33R, 33G and 33B are identical. Thus, only output circuit 33B is described in detail. The collector of transistor 6c is connected through a resistor 18B to power supply terminal 19 and to the base of NPN transistor 20B and PNP transistor 21B. The collector of transistor 20B is connected to power supply terminal 19. Transistors 20B and 21B have their emitters connected together and to the blue cathode 13B of color cathode ray tube 13. The collector of transistor 21B is connected to a constant current source 34 having a constant current of $I_B$ which permits automatically setting the black level current. An electronically controlled shorting switch 35 is connected in parallel with constant current source 34. A control signal in synchronism with the horizontal blanking period is supplied through an input terminal 35a to shorting switch 35 to place shorting switch 35 in the OFF or open condition during horizontal blanking periods and in the ON or closed condition at other times. The video signal appearing at the collector of transistor 6c is a composite video signal from which the horizontal synchronizing signal is removed and in which the signal level during the blanking interval is equal to the peak negative value of the preceding video as shown in FIG. 9C. The collector of transistor 21B is connected to the base of an NPN transistor 36 which has its emitter grounded and its collector connected to the input of a low pass filter, or memory circuit, 37. The output signal from memory circuit 37 is supplied to amplifier circuit 32c. The gain of amplifier circuit 32c is controlled by the output of memory circuit 37.

During the video portion of the signal, the collector of transistor 21B is connected to ground through closed shorting switch 35. Hence, transistor 21B operates as an ordinary emitter follower transistor to feed anode current to cathode ray tube 13. During the horizontal blanking period, shorting switch 35 is OFF or open. The anode current during horizontal blanking, which is determined by the pedestal level established by the collector potential of transistor 6c, passes through the collector of transistor 21B. If the anode current of cathode ray tube 13 differs from constant current $I_B$ of constant current source 23, corresponding to the desired black level current, a difference current flows into the base of transistor 36 which then feeds it back through memory circuit 37 to amplifier circuit 32c. As a result, the gain of amplifier circuit 32c is controlled until the anode current of cathode ray tube 13 during the blanking interval becomes equal to the desired black current $I_B$. During the succeeding video signal period amplifier circuit 32c continues to be controlled by the control signal stored in memory 37, to thus maintain the black level on the picture screen at a value corresponding to the maximum negative peak in the video.

Figure 10:
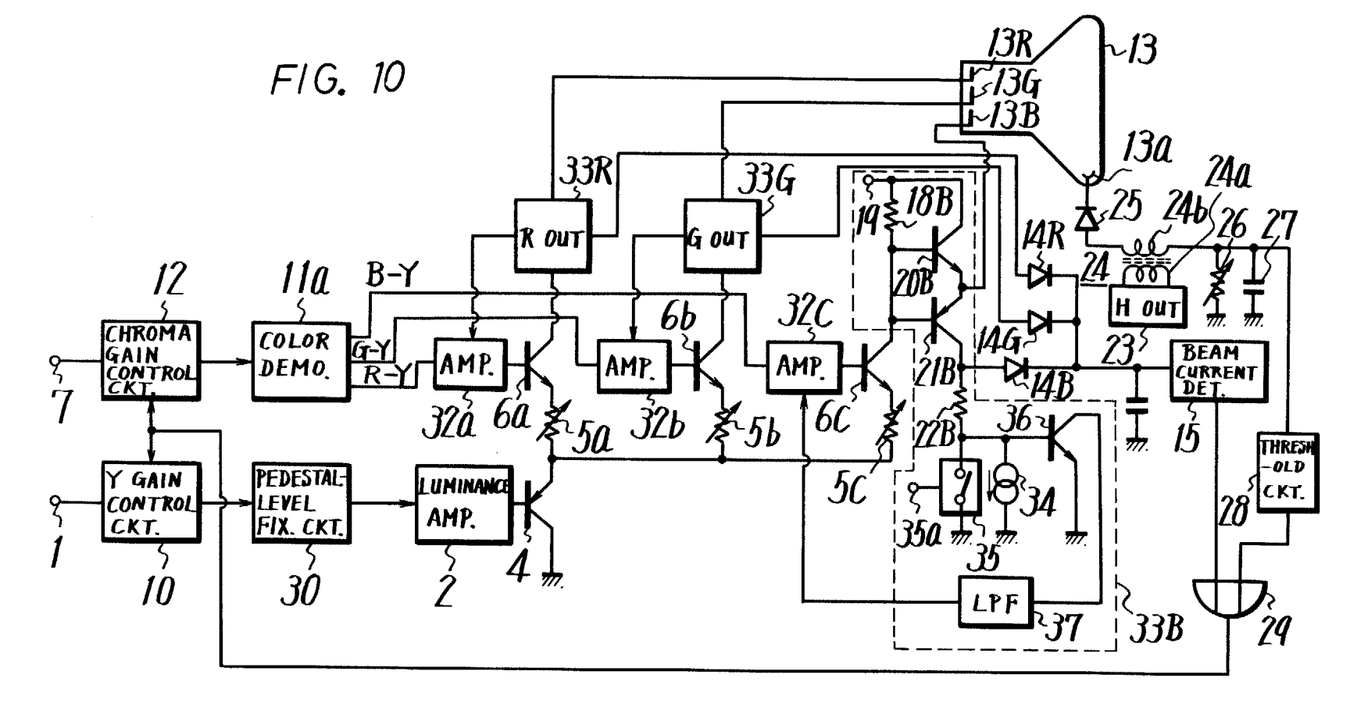
FIG. 10 is a block diagram showing a fourth embodiment of the invention.

Referring now to FIG. 10, there is shown an embodiment of the invention which combines the automatic black level adjustment of FIG. 8 with the automatic white peak level limiting of FIG. 7. A color demodulator circuit 11a provides R-Y, G-Y and B-Y signals to amplifiers 32a, 32b and 32c, respectively, which, in turn, feed matrix transistors 6a, 6b and 6c. The outputs of these matrix transistors are applied through output circuits 33R, 33G and 33B, respectively, to cathodes 13R, 13G and 13B of cathode ray tube 13. The luminance signal at input terminal 1 is applied through luminance gain control circuit 10, pedestal level fixing circuit 30 and luminance amplifier 2 to the base of transistor 4 which controls the current fed to the emitters of matrix transistors 6a, 6b and 6c through variable resistors 5a, 5b and 5c, respectively. Output circuits 33R, 33G and 33B produce control signals which are applied respectively to amplifiers 32a, 32b and 32c to automatically adjust the black level in correspondence to the negative peaks in the video portion of the signal. In addition, the ABL signal from the junction of the cold end of secondary winding 24b of horizontal output transformer 24 and the parallel combination of variable resistor 26 and capacitor 27 is applied through threshold circuit 28 to an input of OR circuit 29. The signal from the OR circuit consisting of diodes 14R, 14G and 14B is applied through beam current detecting circuit 15 to the second input of OR circuit 29. As in the embodiment of FIG. 7, the output of OR circuit 29 is applied to gain control circuits 10 and 12 to thereby limit the white level to the desired saturation level.

Figure 5A:
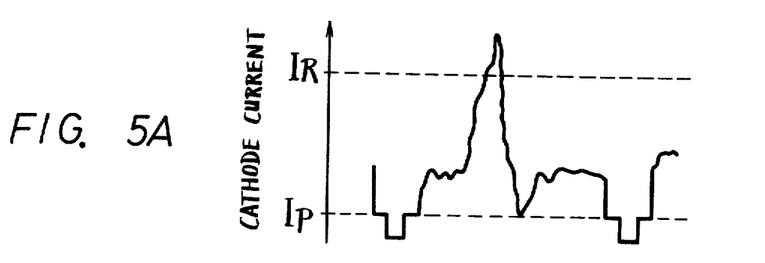
FIGS. 5A-5D are waveform diagrams to which reference will be made in explaining the operation of the present invention.
Figure 5B:
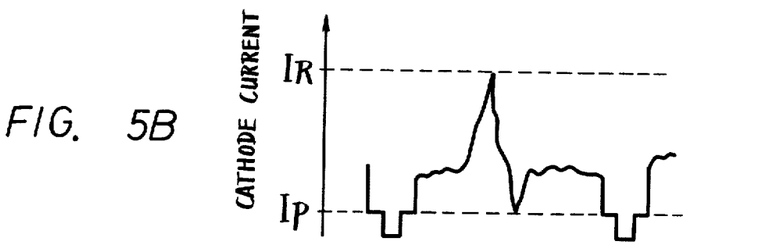
Figure 5C:
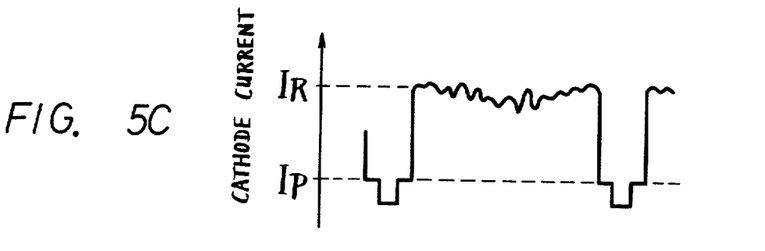
Figure 5D:
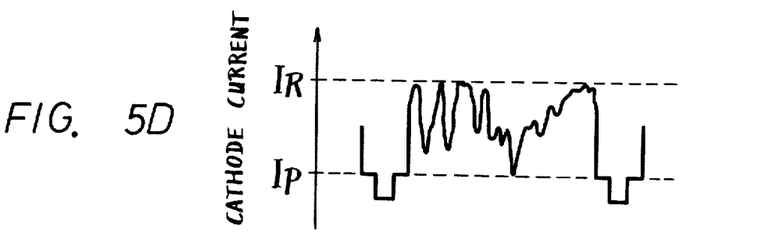

Referring now to FIGS. 5A–5D, a signal, such as shown in FIG. 5A, has its peak or white level limited to saturation current $I_R$ shown in FIG. 5B as a result of the input to gain control amplifiers 10 and 12. In addition, a signal such as shown in FIG. 5C is expanded in a fashion shown in FIG. 5D such that the peak negative level in the video signal is established at cutoff current $I_P$ and the white peak level is established at the saturation current $I_R$. As would be clear to one skilled in the art, such video expansion takes maximum advantage of the dynamic range of the color cathode ray tube.

Figure 11:
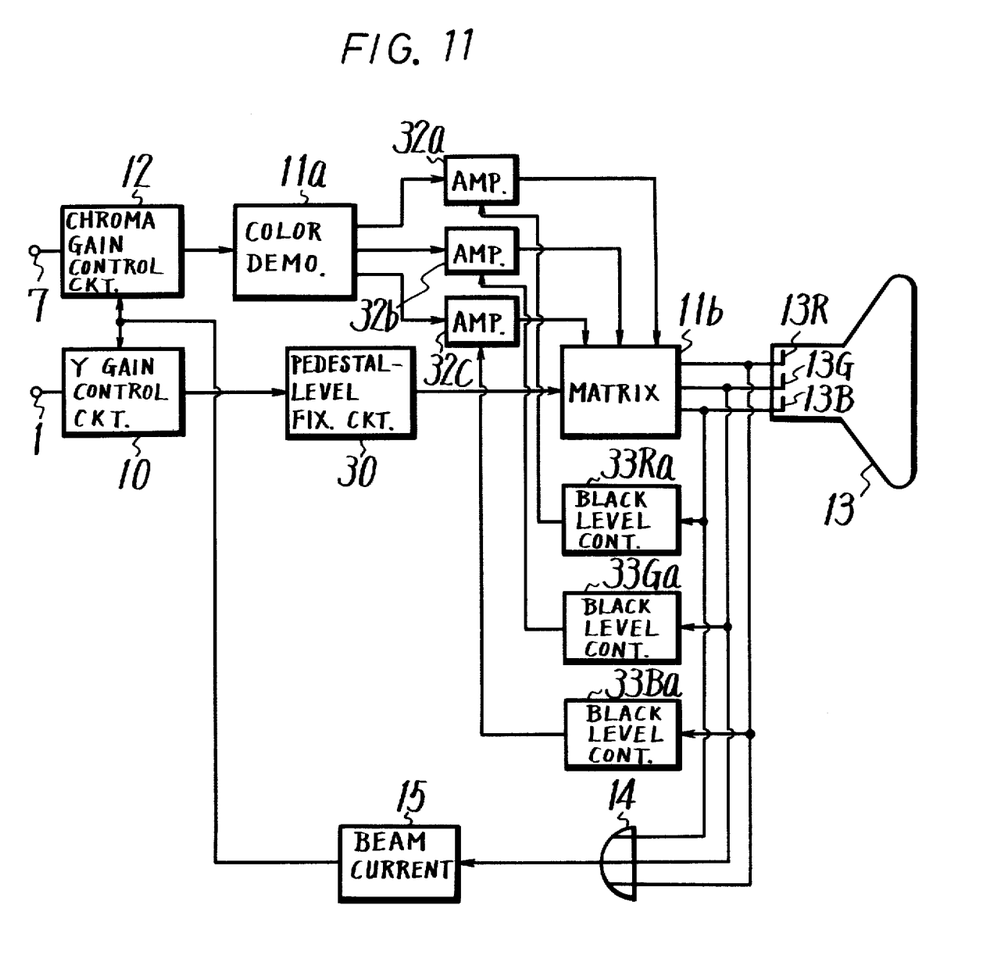
FIG. 11 is a block diagram showing a fifth embodiment of the invention.

FIG. 11 is a further embodiment of the invention which is similar to the embodiment of FIG. 10 except for the omission of control of average beam current using an ABL circuit. Automatic black level adjusting devices 33Ra, 33Ga, and 33Ba include only the black level adjusting portions of output circuits 33R, 33G and 33B in FIGS. 8 and 10 which consist of constant current source 34, shorting switch 35 and transistor 36. The remainder of the circuit of FIG. 11 is the same as those previously described and the description is therefore not repeated here.

Having described specific preferred embodiments of the invention with reference reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A luminance control circuit for a television receiver which is operative to reproduce a video signal applied to a cathode ray tube having a dynamic range between a cutoff level and a saturation level, comprising:

means for sensing a level of said video signal in respect to at least one of said cutoff level and said saturation level of the tube and for producing a control signal in response thereto; and control means responsive to said control signal for varying said video signal applied to said cathode ray tube so as to maintain said video signal, as applied to said cathode ray tube, within said dynamic range.

2. A luminance control circuit according to claim 1; wherein said means for sensing includes means for sensing said cutoff level and said saturation level.

3. A luminance control circuit according to claim 1; wherein said cathode ray tube has an average beam current and said means for sensing further includes means for sensing said average beam current and for producing said control signal in response to one of said saturation level and said average beam current exceeding a predetermined value thereof.

4. A luminance control circuit according to claim 1; wherein said video signal is a color video signal containing first, second and third different color signals separately applied to said cathode ray tube, said means for sensing including means for selecting the greatest of said first, second and third color signals and for producing said control signal in response to said greatest color signal exceeding said saturation level.

5. A luminance control circuit according to claim 4; wherein said means for sensing includes a beam current detector operative to receive said greatest color signal and to produce said control signal if the received color signal exceeds said saturation level.

6. A luminance control circuit according to claim 4; wherein said means for sensing further includes a differential amplifier having first and second inputs and producing at least one output, a voltage source supplying a constant voltage to said first input, said means for selecting includes an OR circuit operative to select the greatest of said first, second and third color signals and to apply said greatest color signal to said second input, and said at least one output is at least part of said control signal.

7. A luminance control circuit according to claim 6; wherein said means for sensing further includes a capacitor connected between said second input and a reference potential for storing a peak of said greatest color signal.

8. A luminance control circuit according to claim 1; wherein said cathode ray tube has an average beam current, said video signal is a color video signal having first, second and third color signals separately applied to said cathode ray tube, said means for sensing includes first means for selecting the greatest of said first, second and third color signals and for producing a first signal in response to said greatest color signal exceeding said saturation level, means for producing a second signal in response to said average beam current exceeding a predetermined value, and second means for selecting the greater of said first signal and said second signal as said control signal.

9. A luminance control circuit according to claim 8; wherein said television receiver includes a flyback transformer having at least a secondary winding; and said means for producing a second signal includes an automatic beam limiting circuit connected to flyback transformer for producing an average beam current signal which is proportional to said average beam current, and a threshold circuit operative to produce said second signal when said average beam current signal exceeds a threshold value.

10. A luminance control circuit according to claim 9; wherein said automatic beam limiting circuit includes means for manually adjusting at least one of said average beam current signal and said threshold value.

11. A luminance control circuit according to claim 1; wherein said video signal includes a luminance component and a chrominance component, and said control means includes a luminance gain control circuit and a chrominance gain control circuit for adjustably amplifying said luminance and chrominance components, respectively.

12. A luminance control circuit according to claim 1; wherein said video signal includes a video interval and a blanking interval; and said means for sensing includes means for comparing said video signal applied to said cathode ray tube with said cutoff level during said blanking interval and for producing said control signal in response thereto.

13. A luminance control circuit according to claim 12; further comprising means for storing a stored peak value of said video signal during each said video interval, and means for applying said stored peak value to said control means during said blanking interval.

14. A luminance control circuit according to claim 13; wherein said stored peak value applied to said control means during a blanking interval is a black level in a succeeding video interval.

15. A luminance control circuit according to claim 1; wherein said video signal includes a video interval having maximum and minimum video levels therein and a blanking interval; and said control means is at least a first gain controlled amplifier for controlling said minimum level of said video signal to be predetermined in respect to said cutoff level, and at least a second gain controlled amplifier for controlling said maximum level of said video signal to a predetermined value in respect to said saturation level whereby said video signal varies over substantially the entire dynamic range of said cathode ray tube.

16. A luminance control circuit according to claim 1; wherein said video signal is a color video signal having first, second and third color signals separately applied to said cathode ray tube, and a luminance signal, and said color video signal includes a video interval and a blanking interval; and further comprising first, second and third means for controlling said first, second and third color signals in response to said luminance signal, means for storing a stored peak value of said luminance signal during said video interval, means for applying said stored peak value to said first, second and third means for controlling during said blanking interval; and further wherein said means for producing a control signal includes means for producing first, second and third control signals, respectively, which are applied respectively to said first, second and third means for controlling.

17. A luminance control circuit according to claim 1; wherein said levels of the video signal is an amplitude thereof.

18. A luminance control circuit according to claim 1; wherein said level of the video signal is a DC level thereof.

19. A luminance control circuit according to claim 1; wherein said cathode ray tube has an average beam current, and said means for sensing includes means for sensing when said video signal is below said cutoff level and above said saturation level and when said average beam current exceeds a predetermined value.

20. A luminance control circuit according to claim 1; wherein said level of the video signal is a white peak level, and said control means is operative to limit said white peak level to a value no greater than said saturation level.

21. A luminance control circuit according to claim 1; wherein said level of the video signal is a minimum level thereof, said cutoff level is a black level, and said control means is operative to control said minimum level to coincide with said black level.

22. A luminance control circuit according to claim 21; wherein said video signal has a white peak level, and said control means is operative to control said white peak level to coincide with said saturation level.

23. A luminance control circuit for a television receiver including a cathode ray tube having a dynamic range between a cut off level and a saturation level and being operative to produce a video image in response to the reception of a video signal having blanking intervals interposed between video intervals; said luminance control circuit comprising means for establishing a predetermined grey level; black level detecting means for detecting the darkest level of said video signal which is lower than said predetermined grey level during said video intervals; and means responsive to said black level detecting means for establishing said darkest level as a black level of said video signal as applied to said cathode ray tube.

24. A luminance control circuit according to claim 23; further comprising means for sensing a relationship of said video signal to said saturation level and providing a control signal in correspondence thereto; and control means responsive to control signal for varying a characteristic of said video signal as applied to said cathode ray tube so that the applied video signal is maintained within said dynamic range.

25. A luminance control circuit according to claim 24; further comprising automatic brightness limiting means.

26. A luminance control circuit according to claim 24; in which said video signal includes a plurality of color signals separately applied to said cathode ray tube; and in which said means for sensing a relationship of said video signal to said saturation level includes means for selecting the largest of said plurality of color signals, and means for producing said control signal in response to said largest color original exceeding said saturation level.

27. A luminance control circuit according to claim 24; in which said means for sensing a relationship of said video to said saturation level includes beam current detecting means, and means for providing said control signal when the detected beam current exceeds a value corresponding to said saturation level.

28. A luminance control circuit according to claim 23; in which said means for establishing a predetermined grey level includes a source of an inverse blanking signal; and adding means receiving said video signal and said inverse signal so that, during each of said blanking intervals, the output of said adding means constitutes said grey level.

29. A luminance control circuit according to claim 23; in which said means responsive to said black level detecting means for establishing said darkest level as said black level includes gain controlled amplifying means, means for sensing an anode current of said cathode ray tube during each of said blanking intervals, means for providing a predetermined constant current, and means for comparing the sensed anode current with said constant current and applying any difference therebetween as a feedback signal to said gain controlled amplifying means for bringing said sensed anode current into correspondence with said constant current.

* * * * *